United States Patent
Sviberg et al.

(10) Patent No.: US 10,576,811 B2
(45) Date of Patent: Mar. 3, 2020

(54) FOLDING TOP HAVING PANEL BOWS

(71) Applicant: Webasto SE, Stockdorf (DE)

(72) Inventors: Magnus Sviberg, Stockdorf (DE); Heinrich Wullrich, Stockdorf (DE); Robert Elek, Stockdorf (DE); Franz Haberl, Stockdorf (DE)

(73) Assignee: Webasto SE, Stockdorf (DE)

( * ) Notice: Subject to any disclaimer, the term of this patent is extended or adjusted under 35 U.S.C. 154(b) by 39 days.

(21) Appl. No.: 15/656,834

(22) Filed: Jul. 21, 2017

(65) Prior Publication Data
US 2018/0050580 A1 Feb. 22, 2018

(30) Foreign Application Priority Data

Aug. 22, 2016 (DE) .................. 10 2016 115 505

(51) Int. Cl.
*B60J 7/12* (2006.01)
*B60J 10/90* (2016.01)
*B32B 3/12* (2006.01)
*B32B 27/40* (2006.01)
*B32B 27/10* (2006.01)

(52) U.S. Cl.
CPC .............. *B60J 7/1226* (2013.01); *B32B 3/12* (2013.01); *B32B 27/10* (2013.01); *B32B 27/40* (2013.01); *B60J 7/1234* (2013.01); *B60J 10/90* (2016.02); *B32B 2605/00* (2013.01)

(58) Field of Classification Search
CPC ........ B60J 7/1226; B60J 10/90; B60J 7/1234; B32B 3/12; B32B 27/10; B32B 27/40; B32B 2605/00

USPC .................................................. 296/107.01
See application file for complete search history.

(56) References Cited

U.S. PATENT DOCUMENTS

| 6,283,532 B1* | 9/2001 | Neubrand | B60J 7/1265 296/107.07 |
| 7,510,231 B2* | 3/2009 | Lewis | B60J 7/145 296/107.07 |
| 7,690,716 B2* | 4/2010 | Dilluvio | B60J 7/0069 296/107.01 |
| 7,798,554 B2* | 9/2010 | Beierl | B60J 10/82 296/107.01 |

* cited by examiner

Primary Examiner — Joseph D. Pape
Assistant Examiner — Dana D Ivey
(74) Attorney, Agent, or Firm — Fitch, Even, Tabin & Flannery, LLP

(57) ABSTRACT

A top of a convertible vehicle, having a foldable top covering and a top linkage, from which the top covering can be displaced between a closed position spanning a vehicle interior and a storage position releasing the vehicle interior to the top and which comprises a linkage arrangement on each of the two sides of the top linkage relative to a vertical longitudinal center plane of the top, panel bows extending between the two linkage arrangements arranged on both sides of the top linkage, said panel bows being arranged flush behind each other in the longitudinal direction of the top when in the closed position and being arranged atop of each other when in the storage position and one of the panel bows forming a backlite bow which accommodates a backlite. The backlite bow is realized as a frame-like composite part which encloses the backlite.

15 Claims, 3 Drawing Sheets

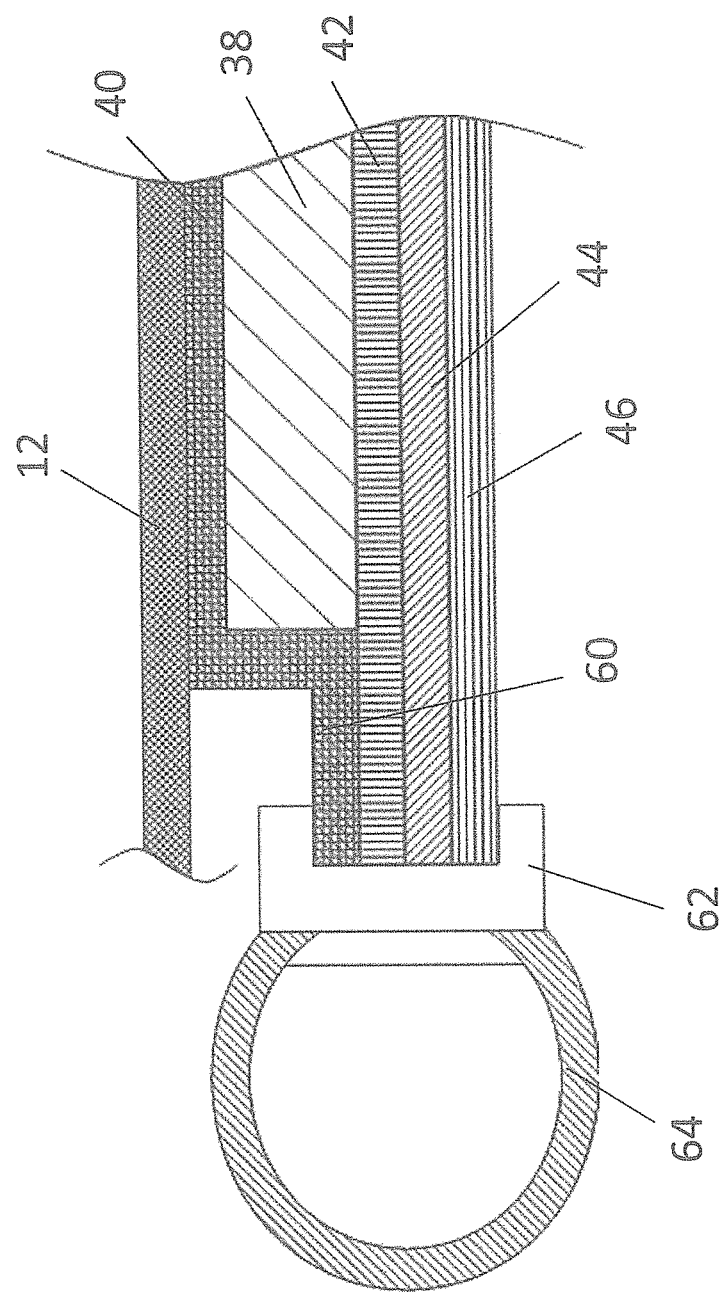

FOLDING TOP HAVING PANEL BOWS

CROSS-REFERENCE TO RELATED APPLICATIONS

This application claims priority from German Application No. 10 2016 112 963 0.1, filed Jul. 14, 2016, which is hereby incorporated herein by reference in its entirety for all purposes.

FIELD

A convertible vehicle top.

BACKGROUND

A so-called panel-bow top in which a top covering spans so-called panel bows when the top is in a closed position spans a vehicle interior. The panel bows are part of a linkage arrangement which can be displaced between the closed position spanning the vehicle interior and a storage position releasing the vehicle interior to the top and which comprises a linkage arrangement on each of its two sides relative to a vertical longitudinal center plane of the top. The panel bows, which are arranged between the two linkage arrangements, are panel elements which extend in the transverse direction of the top as well as in the longitudinal direction of the top and are arranged flush behind each other when in the closed position of the top so as to form an at least mostly continuous contact and support surface for the top covering. When in the storage position, in which the top is accommodated in particular by a rear-side top storage compartment of the respective vehicle, the panel bows are arranged atop of each other. A panel-bow top often comprises four panel bows of which one forms a front bow which can be fixed to a front windshield cowl of the respective vehicle when in the closed position of the top. One of the remaining panel bows forms a so-called backlite bow which accommodates a backlite. When in the closed position of the top, the two other panel bows are arranged between the backlite bow and the front bow.

In known panel-bow tops, the backlite is mounted such that it is connected to the top covering subsequent to a gluing method or a different fixing method and is thereafter mounted to the backlite bow formed as a panel bow. Furthermore, seals can be formed on the backlite bow. These seals comprise separate molding trims and/or holders which are mounted to the backlite bow. Accordingly, mounting the backlite and the seal has been highly cumbersome in panel-bow tops thus far.

SUMMARY

The object of the invention is to create a top of the make mentioned above which allows favorable mounting conditions for the backlite.

According to the invention, the object is attained by the top having the features of claim 1.

According to the invention, the backlite bow is realized as a frame-like composite part which encloses the backlite. By being realized as a composite part, it is possible to directly form connecting means for the backlite in the process when producing the backlite or panel bow, respectively, so that the backlite can be easily mounted in the top according to the invention.

In a preferred embodiment of the top according to the invention, the composite part, which forms the backlite bow and is a light-weight part, comprises a core layer which is covered by a plastic cover layer on both sides which can be provided with a reinforcement. The composite part is designed like a sandwich which is provided with a covering shell in the type of the cover layers. This composite part can be produced in a tool in which prefabricated level plastic mats and reinforcing mats are inserted, the core layer being placed between the plastic mats and the reinforcing mats. Due to its oversize, the core presses the mats against the tool walls upon closing the tool. Subsequently, the composite part is hardened. The tool is based on a simple concept and a simple produc-tion method, wherein an integration of functions and components is possible when producing the panel bow. Treating the composite part against corrosion is not necessary.

In a special embodiment of the top according to the invention, the core layer is made out of a honeycomb structure, in particular of a paper honeycomb, so as to ensure a high component rigidity. Alternatively, the core layer can be made out a plastic rigid foam.

The reinforcements of the cover layer are, for example, made of glass fibers and/or carbon fibers. When being produced, semi-finished products can be used in the type of glass-fiber mats or carbon-fiber mats.

It is also possible to produce each of the cover layers according to a so-called LFI method in which a mixture of a plastic component and fiber reinforcements are injected into the respective manufacturing tool.

In a preferred embodiment of the top according to the invention, the plastic of each of the cover layers is made of a polyurethane material. Of course, it is also possible to use other plastic materials, which can be processed via a thermoforming process, an injection molding process, an injection compression molding process or a foaming process, in order to produce a composite part.

In order to provide an exactly fitted mounting for the backlite at the backlite bow, the backlite bow comprises a flange to which a backlite is fixed according a preferred embodiment of the top according to the invention.

In order to be able to keep the construction height or rather the thickness of the backlite bow including the backlite as small as possible, the backlite bow preferably does not have a core cover in the area of the flange, i.e. the cover layers are directly jointed or realized integrally, respectively, in the area of the flange. The core is therefore entirely enclosed by the cover layers.

In order to provide the backlite with sufficient inherent rigidity and to simplify mounting the backlite at the backlite bow, the backlite has a frame in a functional embodiment of the top according to the invention, said backlite directly or indirectly resting against the flange of the backlite bow via the frame.

Preferably, fixing means are formed on the frame of the backlite for the backlite. Thus, the fixing means are an integral part of the backlite. The fixing means therefore do not have to be provided additionally as separate elements when mounting the backlite.

The fixing means are, for example, made of stay bolts which each engage through a hole of the flange and preferably comprise a thread. The stay bolts can be integrated as insertion parts when forming the frame so that their axes are essentially perpendicular to the plane of the backlite. The stay bolts are fixed to the backlite bow or rather the flange of the backlite bow preferably by means of a nut.

In particular in the top according to the invention, it is possible to fix the top covering to the backlite bow in conjunction with the backlite in one mounting step. For this purpose, it is useful if the top covering is clamped between the backlite and the flange with an edge area.

In order to further alleviate mounting the top covering to the backlite bow, it is advantageous if the edge area, which is clamped between the backlite and the flange, is provided with a holding strip. The holding strip can increase the top covering's rigidity and tear strength.

In a special embodiment, the thickness of the unit made up of the top covering, the backlite bow and the backlite, as well as the step height between the backlite flange and the outer side of the backlite bow is chosen such that an upper side of the top covering, which spans the backlite bow, at least mostly flushes with an outer surface of the backlite. Thus, a transition is realized having almost no step between the backlite and the top covering which enables a good optical appearance of the top according to the invention.

The backlite bow of the top according to the invention can be provided with further functional elements in the manufacturing process. On at least one outer edge, a seal flange is, for example, formed on the composite part which forms the backlite bow, a seal profile preferably being able to be plugged onto said seal flange. The seal profile can comprise a clamping shell or something similar, by means of which the seal profile can be fixed to the flange. Further components for connecting seals are not necessary.

The seal flange is, for example, formed on the lateral edges of the composite part if the backlite bow extends to the lateral C-pillars of the respective vehicle and if the seals are arranged to side windows of the respective car on the C-pillars. It is also possible for the seal flange to be formed on the frontward edge of the composite part so that the seal profile interacts with a panel bow which is arranged frontward from the backlite bow when in the closed position of the top. Furthermore, it is possible for the seal flange to be arranged on the rearward edge or lower edge, respectively, of the composite part and for the allocated seal profile to interact with a convertible top compartment cover or a tension bow of the top.

Further advantages and advantageous embodiments of the subject matter of the invention can be taken from the description, the drawing and the claims.

An exemplary embodiment of a top according to the invention is illustrated in a schematically simplified manner in the drawing and is further described in the following description. In the drawing,

BRIEF DESCRIPTIONS OF THE DRAWINGS

FIG. 3 shows a cut through a backlite bow having a seal flange.

DETAILED DESCRIPTION

Figure 1:
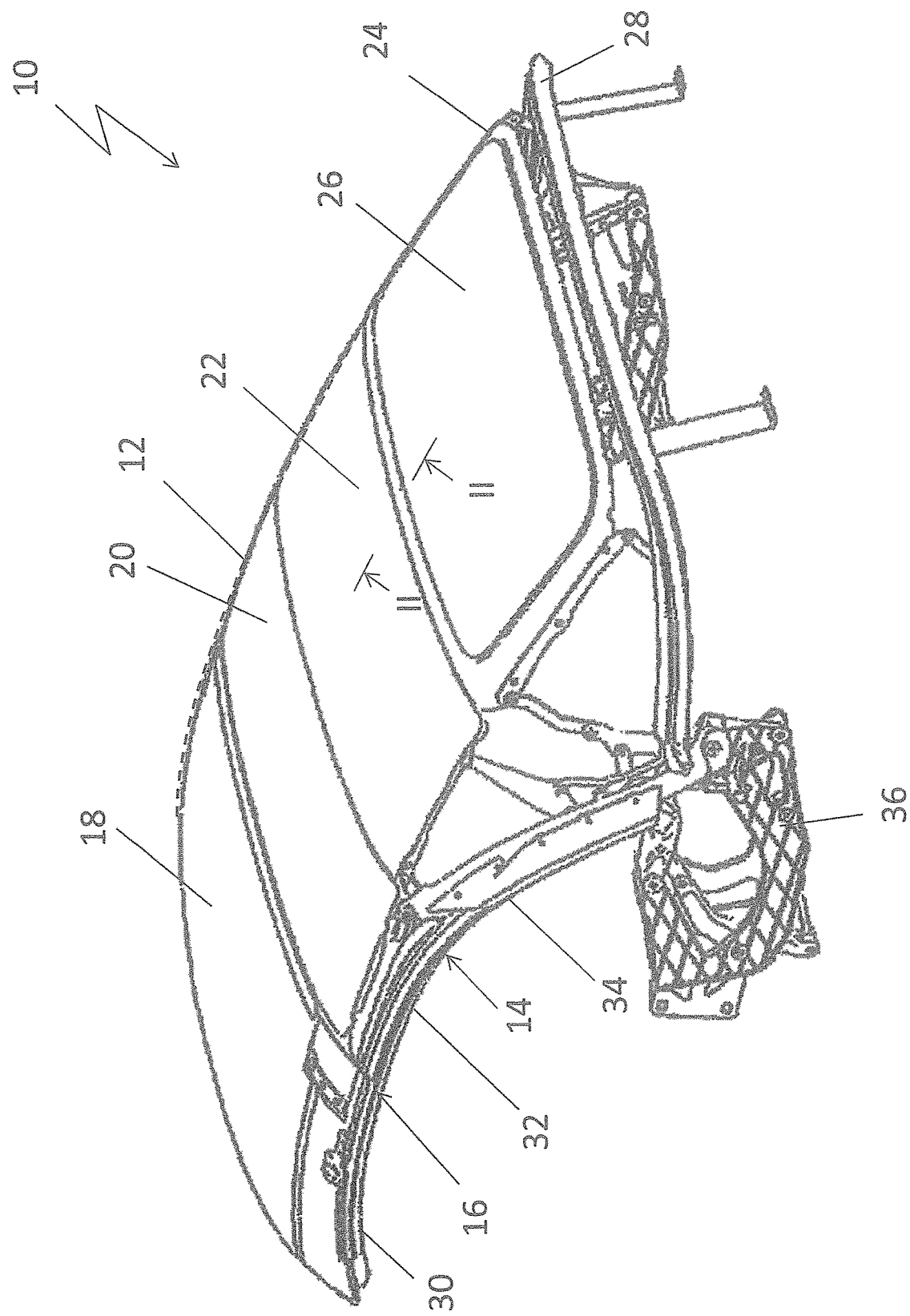
FIG. 1 shows a perspective rear view of a top linkage of a folding top according to the invention.
Figure 2:
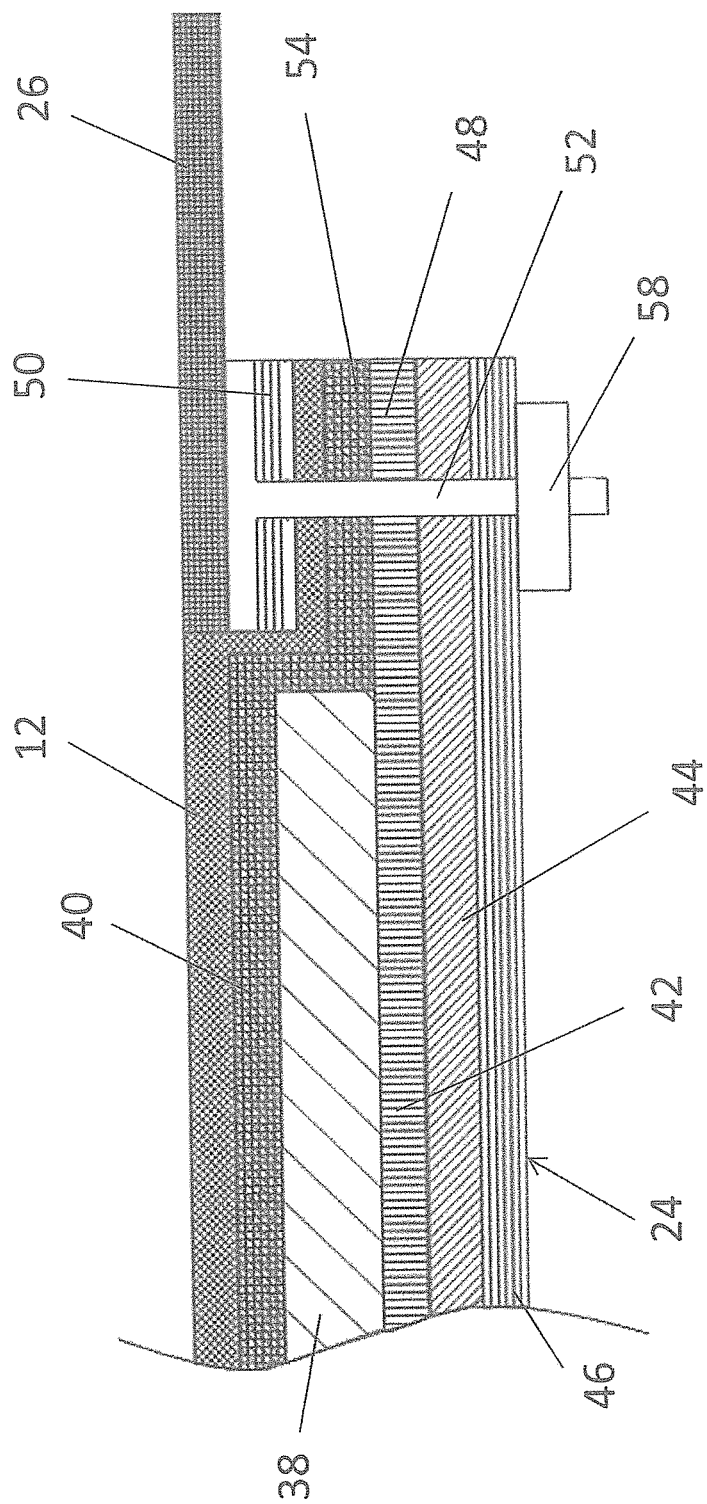
FIG. 2 shows a cut through a backlite bow of the folding top according to FIG. 1 along the line II-II from FIG. 1.

In the drawing, a convertible top 10 realized as a folding top or rather a panel-bow top of a convertible vehicle, which is not further illustrated, is illustrated. The convertible top 10 can be displaced between a closed position, which is illustrated in FIG. 1 and in which an interior of the vehicle is spanned, and a storage position, in which the interior of the vehicle is released towards the top and in which the top is accommodated by a rearward top storage compartment of the respective vehicle.

The convertible top 10 comprises a top covering 12 made of a foldable, waterproof textile. For spanning the top covering 12, the convertible top 10 comprises a top linkage 14 which comprises a linkage arrangement 16 on each of its two sides relative to a vertical longitudinal center plane of the top. The linkage arrangements 16 arranged on both sides of the top linkage 14 are formed mirror-symmetrical to each other relative to the vertical longitudinal center plane of the top. Four so-called panel bows 18, 20, 22 and 24 extend between the linkage arrangements 16, are arranged flush behind each other in the longitudinal direction of the vehicle or rather top when in the closed position of the top, and are arranged stacked atop of each other in the top storage compartment when in the storage position of the convertible top 10. The panel bow 18 forms a front bow which can be fixed to a front windshield cowl of the respective vehicle when in the closed position; the panel bow 20 forms a frontal middle bow which abuts against the front bow with its front edge; the panel bow 22 forms a rear middle bow which abuts against the frontal middle bow with its front edge; and the panel bow 24 forms a backlite bow which accommodates a backlite 26.

The top covering 12 is fixed to the front bow 18 and to the backlite bow 24 as well as to a tension bow 28 with its rearward edge, said tension bow 28 forming the rearward edge of the top when in the closed position of the top. The top covering 12 is laterally fixed to a frontal roof-frame element 30, a middle roof-frame element 32 and a rearward roof-frame element 34 on each of its two sides, said roof-frame element 34 being part of a main pillar, which is pivotably mounted on a main bearing 36 fixed to the vehicle, in conjunction with a main link and being part of a driven main four-joint linkage via which the convertible top 10 is displaceably moved.

The panel bows 18, 20, 22 and 24 are each formed as a composite part designed like a sandwich.

The panel bow 24 forming the backlite bow is realized as a frame-like composite part which encloses the backlite 26. The composite part is designed like a sandwich having a core layer 38 which is made of a paper honeycomb. The core layer 38 is limited on both sides by a cover layer 40 and 42, respectively, which are made of a polyurethane layer having a reinforcement made of glass fibers.

The cover layer 42 facing the vehicle interior abuts against an insulation layer 44 which can comprise acoustic insulation properties as well as thermal insulation features if necessary. A textile layer 46, in turn, abuts against the insulation layer 44 and forms an internal visible side of the convertible top 10 so that an additional internal-canopy element is not required. Instead of the textile layer, the insulation layer 44 can be provided with a flocked coating. Alternatively, it is also possible for the textile layer or flocked coating to be directly applied on the internal cover layer 42 and to omit forming an insulation layer.

The cover layer 40 is covered by the top covering 12 on the outer side.

The sandwich-like design of the other panel bows 18, 20 and 22 corresponds to the sandwich-like design described above.

For accommodating the backlite 26, the panel bow 24 forming the backlite bow comprises a flange 48 at its internal edge, said flange 48 being free of the core layer 38.

The flange 48 forms a step on which an edge area of the backlite 26 rests. For this purpose, the backlite 26 has a frame 50 made of foamed polyurethane, said frame 50 comprising stay bolts 52 as insertion parts across its periphery, the axes of the stay bolts 52 extending perpendicular to the plane of the backlite 26 and the stay bolts 52 each engaging through an edge area of the top covering 12 provided with a holding strip 54 and a hole 56 formed in the flange 48. In order to fix the backlite 26 to the frame-like panel bow, a nut 58 is screwed onto a thread of each of the stay bolts 52 so that the stay bolts 52 are fixed to the flange 48.

The unit consisting of the edge area or rather the holding strip 54 of the top covering 12, the frame 50 of the backlite 26, the base of the stay bolt 52 and the backlite 26 has a thickness which is chosen such that an outer surface of the top covering 12 essentially aligns flush with an outer surface of the backlite 26.

As can be seen in FIG. 3, a seal flange 60 can be formed on the backlite bow 24 on at least one of its outer edges, a seal profile 60 being plugged onto said seal flange 60 via a clamping shell 62, a seal being able to be realized between, for example, the panel bow 24, which forms the backlite bow, and the middle panel bow 22 by means of the seal profile 64. The clamping shell 62, into whose groove the seal flange 60 engages, is tightly connected to the seal profile 64. The seal flange 60 essentially corresponds to the flange 48, i.e. it does not have the core layer 38.

The invention claimed is:

1. A top of a convertible vehicle, comprising:
    a foldable top covering and
    a top linkage, by means of which the foldable top covering can be displaced between a closed position spanning a vehicle interior and a storage position and which comprises a linkage arrangement arranged on each of its two sides relative to a vertical longitudinal center plane of the top, panel bows extending between the linkage arrangements arranged on both sides of the top linkage, said panel bows being arranged flush behind each other in the longitudinal direction of the top when in the closed position and being arranged atop of each other when in the storage position and one of the panel bows forming a back-lite bow which receives a back lite,
    wherein the backlite bow is realized as a frame-like composite part which encloses the backlite; and
    wherein in the closed position of the foldable top covering, the panel bows form an at least mostly continuous contact and support surface for the top covering.

2. The top according to claim 1, wherein the composite part comprises a core layer which is covered by a plastic cover layer on both sides, said cover layer being provided with a reinforcement.

3. The top according to claim 2, wherein the reinforcement of the cover layers is made of glass fibers and/or carbon fibers.

4. The top according to claim 2, wherein the plastic of each of the cover layers is made of a polyurethane material.

5. The top according to claim 1, wherein the back-lite bow comprises a flange to which the backlite is mounted.

6. The top according to claim 5, wherein the backlite bow does not have a core cover in the area of the flange.

7. The top according to claim 5, wherein the backlite has a frame by means of which the backlite directly or indirectly rests against the flange.

8. The top according to claim 7, wherein fixing means for the backlite are formed on the frame.

9. The top according to claim 8, wherein the fixing means are made of stay bolts which each engage through a hole of the flange.

10. The top according to claim 9, wherein the stay bolts are each fixed to the flange by means of a nut.

11. The top according to claim 5, wherein the top covering is clamped between the backlite and the flange with an edge area.

12. The top according to claim 11, wherein the edge area of the top covering is provided with a holding strip.

13. The top according to claim 1, wherein an upper side of the top covering is at least mostly flush with an outer surface of the backlite.

14. A top of a convertible vehicle, comprising:
    a foldable top covering and
    a top linkage, by means of which the foldable top covering can be displaced between a closed position spanning a vehicle interior and a storage position and which comprises a linkage arrangement arranged on each of its two sides relative to a vertical longitudinal center plane of the top, panel bows extending between the linkage arrangements arranged on both sides of the top linkage, said panel bows being arranged flush behind each other in the longitudinal direction of the top when in the closed position and being arranged atop of each other when in the storage position and one of the panel bows forming a back-lite bow which receives a back lite, wherein the backlite bow is realized as a frame-like composite part which encloses the backlite;
    wherein the composite part comprises a core layer which is covered by a plastic cover layer on both sides, said cover layer being provided with a reinforcement; and
    wherein the core layer is made of a honeycomb structure.

15. A top of a convertible vehicle, comprising:
    a foldable top covering and
    a top linkage, by means of which the foldable top covering can be displaced between a closed position spanning a vehicle interior and a storage position and which comprises a linkage arrangement arranged on each of its two sides relative to a vertical longitudinal center plane of the top, panel bows extending between the linkage arrangements arranged on both sides of the top linkage, said panel bows being arranged flush behind each other in the longitudinal direction of the top when in the closed position and being arranged atop of each other when in the storage position and one of the panel bows forming a back-lite bow which receives a back lite, wherein the backlite bow is realized as a frame-like composite part which encloses the backlite;
    wherein an upper side of the top covering is at least mostly flush with an outer surface of the backlite; and
    wherein a seal flange is formed on at least an outer edge of the composite part, a sealing profile being preferably plugged onto the seal flange.

* * * * *